United States Patent
Spickerman et al.

(10) Patent No.: US 6,281,995 B1
(45) Date of Patent: Aug. 28, 2001

(54) USE OF CROSS TAP EQUALIZATION TO REDUCE CROSSTALK ARISING FROM INADEQUATE OPTICAL FILTERING IN A WAVELENGTH DIVISION MULTIPLEXED OPTICAL LINK

(75) Inventors: Ralph Spickerman, Redwood City; Geoffrey S. Waugh, San Jose, both of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/546,832

(22) Filed: Apr. 11, 2000

(51) Int. Cl.$^7$ ..................................................... H04J 14/02
(52) U.S. Cl. ........................... 359/124; 359/190; 708/422
(58) Field of Search ................................... 359/124, 111, 359/190; 375/229; 708/422

(56) References Cited

U.S. PATENT DOCUMENTS

| | | | |
|---|---|---|---|
| 4,355,368 | * | 10/1982 | Zeidler et al. ........................ 708/422 |
| 4,989,201 | * | 1/1991 | Glance .................................. 359/133 |

* cited by examiner

*Primary Examiner*—Kinfe-Michael Negash
(74) *Attorney, Agent, or Firm*—Kenneth W. Float

(57) ABSTRACT

Improved wavelength division multiplexed optical links and signal processing methods that employ cross tap equalization to reduce crosstalk arising from inadequate optical filtering. After optical filtering and photodetection, the wavelength division multiplexed signals adjacent either side of a signal whose crosstalk is to be reduced are sampled, weighted and are then subtracted from the signal whose crosstalk is to be reduced. This is done using adaptive correlation, performed simultaneously on all signals, each with respect to its respective adjacent channels. The present invention enables more closely spaced optical carriers to be used in the wavelength division multiplexed optical link.

13 Claims, 2 Drawing Sheets

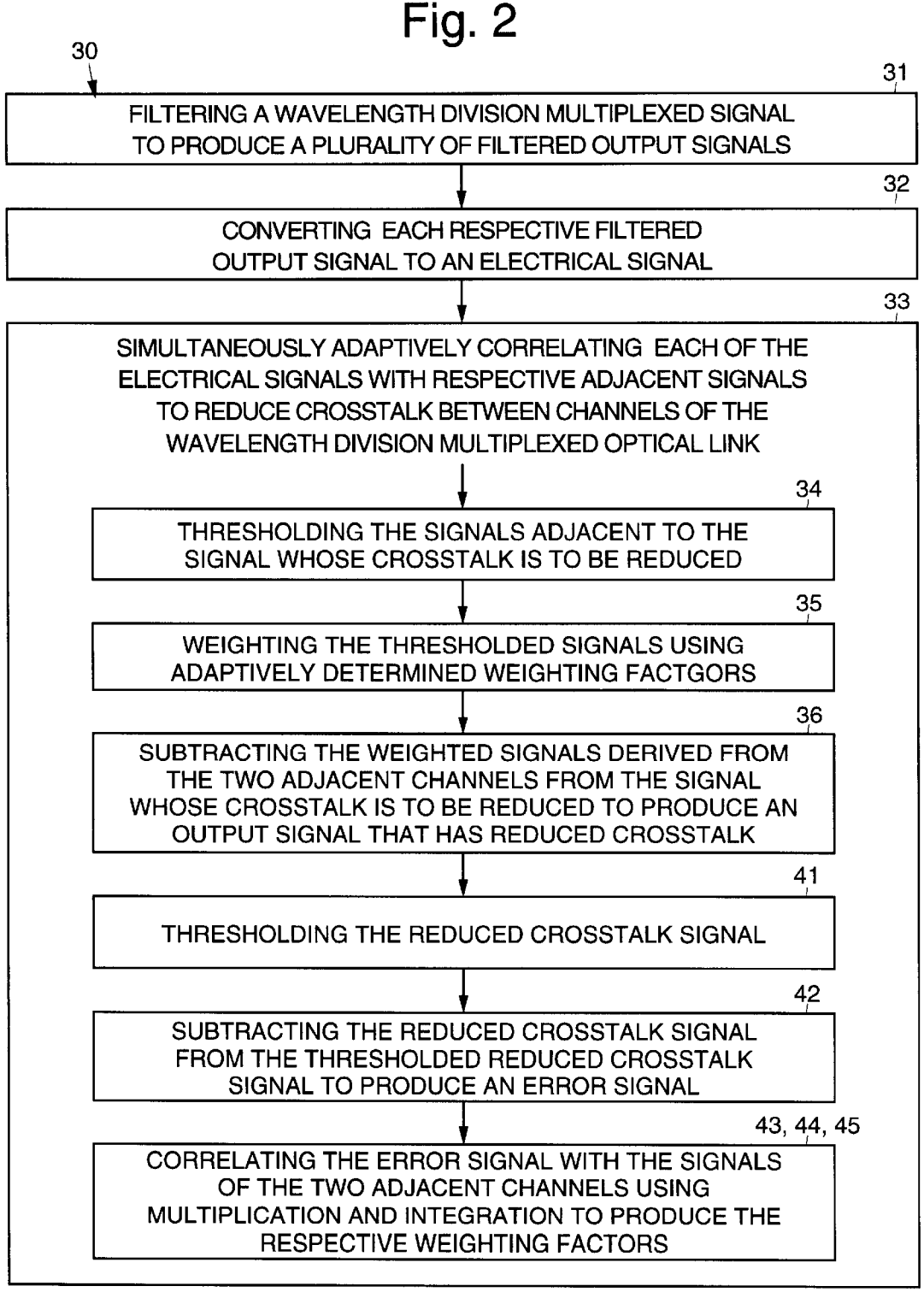

USE OF CROSS TAP EQUALIZATION TO REDUCE CROSSTALK ARISING FROM INADEQUATE OPTICAL FILTERING IN A WAVELENGTH DIVISION MULTIPLEXED OPTICAL LINK

BACKGROUND

The present invention relates generally to wavelength division multiplexed optical links, and more particularly, to wavelength division multiplexed optical links and signal processing methods that are limited by crosstalk arising from transmission non-idealities and from inadequate optical filtering at the receiver optical demultiplexer.

Previous techniques used to reduce the wavelength spacing of wavelength division multiplexed optical links have involved improving optical filtering schemes to separate more narrowly spaced wavelength division multiplexed channels. However, this has proved difficult for channel spacing below 50 GHz.

Accordingly, it is an objective of the present invention to provide for wavelength division multiplexed optical links and signal processing methods that use cross tap equalization to reduce crosstalk arising from inadequate optical filtering and thus enable narrower optical channel spacing.

SUMMARY OF THE INVENTION

To accomplish the above and other objectives, the present invention provides for improved wavelength division multiplexed optical links and signal processing methods that employ cross tap equalization to reduce crosstalk arising from inadequate optical filtering. In practicing the present invention, after optical filtering and photodetection, the wavelength division multiplexed signals adjacent to either side of a signal whose crosstalk is to be reduced are sampled, weighted and are then subtracted from the signal whose crosstalk is to be reduced. This is done using adaptive correlation, and is performed simultaneously on all signals, each with respect to its respective adjacent channels. Thus, crosstalk is removed electrically after photodetection. The present invention permits use of more closely spaced optical carriers to be used in the wavelength division multiplexed optical link.

BRIEF DESCRIPTION OF THE DRAWINGS

The various features and advantages of the present invention may be more readily understood with reference to the following detailed description taken in conjunction with the accompanying drawings, wherein like reference numerals designate like structural element, and in which:

FIG. 2 illustrates an exemplary signal processing method in accordance with the principles of the present invention.

DETAILED DESCRIPTION

Figure 1:
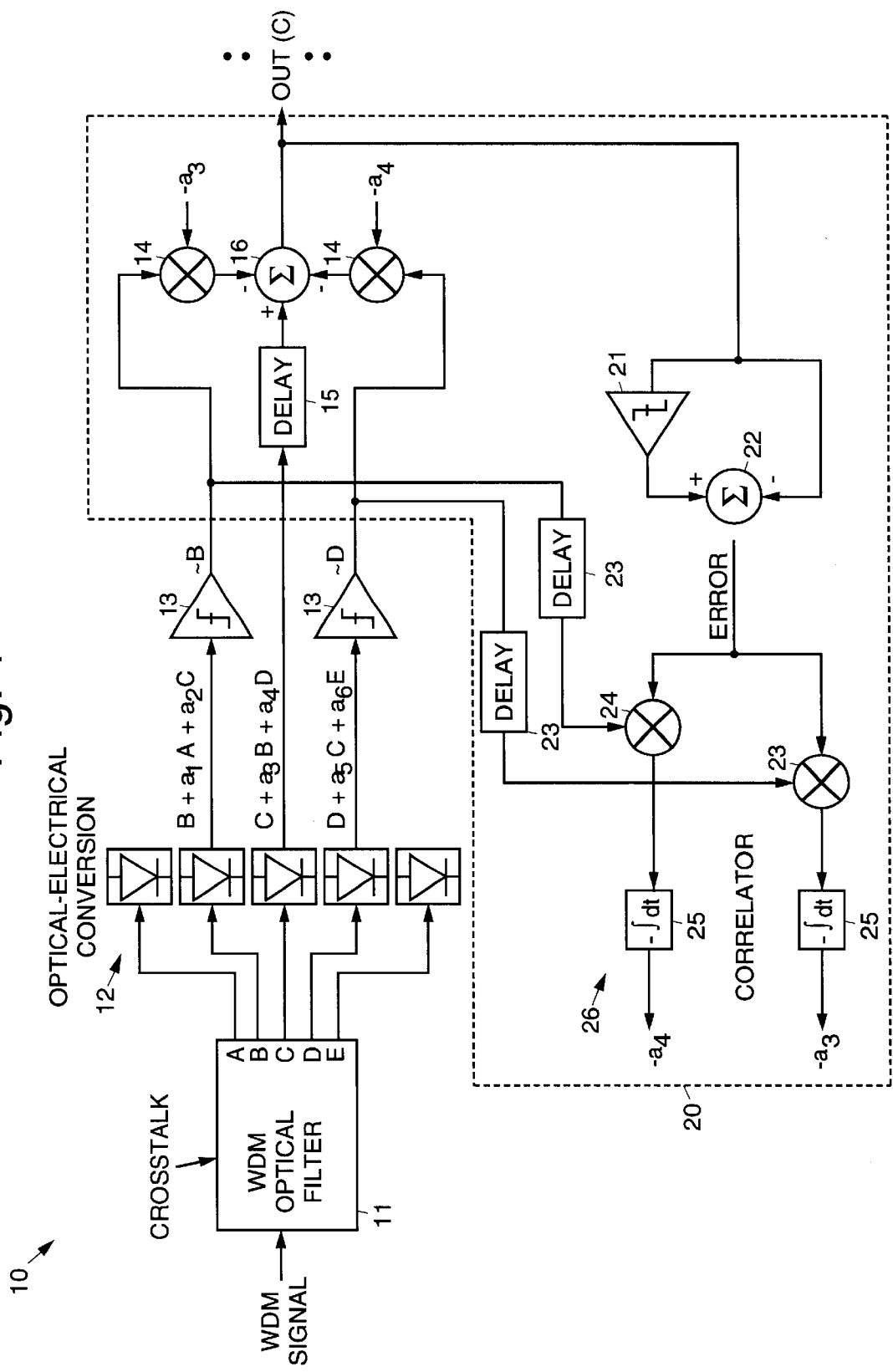
FIG. 1 illustrates an exemplary wavelength division multiplexed optical link in accordance with the principles of the present invention.

Referring to the drawing figures, FIG. 1 illustrates an exemplary wavelength division multiplexed optical link 10 in accordance with the principles of the present invention. The exemplary wavelength division multiplexed optical link 10 shown in FIG. 1 is designed for use with on-off keyed (baseband) signals. Higher order modulation requires a different arrangement, although the principles of the present invention are used in the same manner therein.

The exemplary wavelength division multiplexed optical link 10 comprises a wavelength division multiplexed (WDM) optical filter 11 that receives a wavelength division multiplexed input signal containing optical signals at a plurality of different optical frequencies, and which already may have crosstalk between adjacent optical signals. The WDM optical filter 11 separates out each of the individual wavelength division multiplexed signals, identified as A–E. This filtering may also be insufficiently sharp and thus introduce more crosstalk. Each of the outputs of the WDM optical filter 11 is coupled to an optical-to-electrical converter 12, such as a photodetector 12, for example. The optical-to-electrical converters 12 converts the respective optical signals into corresponding electrical signals.

Each of the electrical signals output by the optical-electrical converters 12 is simultaneously adaptively correlated with signals from respective adjacent channels. For simplicity, and by way of illustration, FIG. 1 shows that channel "C" is the signal whose crosstalk is to be reduced, and that this signal is adaptively correlated with signals from its two adjacent channels "B" and "D" using an adaptive correlator 20.

To accomplish this, the two adjacent channels (channels "B" and "D", for example) are thresholded using digital decision devices 13. The digital decision device 13 is essentially an A/D converter that makes threshold decision, in this case a high or low decision as to whether the applied signal is above or below the threshold, and outputs a corresponding high or low signal. This thresholding yields a good approximation of B and D, marked ~B and ~D in FIG. 1. The thresholded signals of the two adjacent channels are weighted by respective weighting factors $(-a_3, -a_4)$ using two multipliers 14. Computation of the weighting factors is performed in two correlators and is discussed below.

The signal whose crosstalk is to be reduced (channel "C") is delayed in a delay element 15 and input to a summing device 16. The length of this delay line is such that the delay from the optical to electrical converters 12 to the summing device 16 is the same for B, C and D. The summing device 16 subtracts the weighted signals derived from the two adjacent channels from the signal whose crosstalk is to be reduced (channel "C"). The summing device 16 generates an output signal having reduced crosstalk. This processing happens for each of the signals output by the WDM optical filter 11. The adaptive correlation used in the present invention permits use of more closely spaced optical carriers to be used in the wavelength division multiplexed optical link.

In essence, and as is illustrated by the respective equations adjacent the outputs of the optical-to-electrical converters 12, because of crosstalk, the channel "C" has a small amount of crosstalk from channels "B" and "D". This is illustrated by the factors $a_3$ and $a_4$ that modify the signals from the "B" and "D" channels. Similarly, the crosstalk associated with the "B" and "D" channels are shown.

Weighting factors $(-a_3, -a_4)$ for the signals of the two adjacent channels are determined by adaptively correlating their signals with the output signal from the channel whose crosstalk is to be reduced. This is done in an adaptive portion of the adaptive correlator 20, shown at the lower part of FIG. 1. The signal output from the summing device 16 is thresholded in a digital decision device 21. The signal output from the summing device 16 is subtracted from the thresholded signal output by the digital decision device 21 in a second summing device 22 to produce an error signal.

The error signal output from the second summing device 22 is input to two correlators 26 comprising a multiplier 24 and an integrator 25. The multipliers 24 respectively multiply the output signal from the summing device 22 by the approximations of the desired outputs of the two adjacent channels. The approximations of the adjacent channels are delayed 23 such that the delay from the optical to electrical converters 12 to the multipliers 24 is the same for channels B, C and D. Outputs of the respective multipliers 24 are each integrated in the integrator 25 to produce the respective weighting factors ($-a_3$, $-a_4$).

Referring now to FIG. 2, it illustrates an exemplary signal processing method 30 in accordance with the principles of the present invention for reducing crosstalk between channels of a wavelength division multiplexed optical link 10. The exemplary signal processing method 30 comprises the following steps.

A wavelength division multiplexed signal is filtered 31 using a wavelength division multiplexed optical filter to produce a plurality of filtered output signals (A–E). Each respective filtered output signal is converted 32 to an electrical signal. Each of the electrical signals are simultaneously adaptively correlated 33 with respective adjacent signals.

The adaptive correlation 33 of the signals is accomplished by thresholding 34 the signals adjacent to the signal whose crosstalk is to be reduced, weighting 35 the thresholded signals, and subtracting 36 the weighted signals derived from the two adjacent channels from the signal whose crosstalk is to be reduced. This produces an output signal that has reduced crosstalk.

The weighting factors for the signals of the two adjacent channels are determined by adaptively correlating 40 the adjacent channel signals with the output signal from the channel whose crosstalk is to be reduced. This is achieved by thresholding 41 the reduced crosstalk signal, subtracting 42 the reduced crosstalk signal from the thresholded reduced crosstalk signal to produce an error signal. The error signal is correlated 43 with the signals of the two adjacent channels using multiplication 44 and integration 45 to produce the respective weighting factors.

Thus, a wavelength division multiplexed optical link and signal processing method that uses cross tap equalization to allow more closely spaced optical carriers to be used has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A wavelength division multiplexed optical link having reduced crosstalk between channels, comprising:
   wavelength division multiplexed optical filter for receiving a wavelength multiplexed input signal and which generates crosstalk between multiple output channels produced thereby;
   an optical-to-electrical converter coupled to each output of the optical filter for producing a plurality of electrical signals corresponding to the filtered output channels output by the optical filter; and
   an adaptive correlator for simultaneously adaptively correlating each respective output signal from the optical-to-electrical converter with signals from adjacent channels to reduce crosstalk from each of the output signals.

2. The optical link recited in claim 1 wherein each optical-to-electrical converter comprises a photodetector.

3. The optical link recited in claim 1 wherein each optical to electrical converter comprises a coherent homodyne detector.

4. The optical link 10 recited in claim 1 wherein the adaptive correlator comprises:
   first and second digital decision devices for thresholding the signals from the adjacent channels; and
   first and second multipliers for weighting the thresholded signals by respective weighting factors.

5. The optical link recited in claim 4 wherein the summing device subtracts the weighted signals derived from the two adjacent channels from the signal whose crosstalk is to be reduced and generates an output signal having reduced crosstalk.

6. The optical link recited in claim 1 wherein the adaptive correlator further comprises:
   a digital decision device for thresholding the signal output from the summing device 16;
   a second summing device for subtracting the signal output from the summing device from the thresholded signal output by the digital decision device to produce an error signal; and
   first and second correlators for correlating the output signal from the second summing device with outputs of the two adjacent channels.

7. The optical link recited in claim 1 wherein the first and second correlators each comprise a multiplier and an integrator.

8. The optical link recited in claim 7 wherein the multipliers respectively multiply the output signals from the second summing device by the outputs of the two adjacent channels, and outputs of the respective multipliers are each integrated in the integrator to produce the respective weighting factors.

9. A method for reducing crosstalk between channels of a wavelength division multiplexed optical link, comprising the steps of:
   filtering a wavelength division multiplexed signal to produce a plurality of filtered output signals
   converting each respective filtered output signal to an electrical signal
   simultaneously adaptively correlating each of the electrical signals with respective adjacent signals to reduce crosstalk between channels of the wavelength division multiplexed optical link.

10. The method recited in claim 9 wherein adaptive correlation of the signals comprises the steps of:
    thresholding the signals adjacent to the signal whose crosstalk is to be reduced;
    weighting the thresholded signals; and
    subtracting the weighted signals derived from the two adjacent channels from the signal whose crosstalk is to be reduced to produce an output signal that has reduced crosstalk.

11. The method recited in claim 10 wherein the weighting factors for the signals of the two adjacent channels are determined by adaptively correlating the adjacent channel signals with the output signal from the channel whose crosstalk is to be reduced.

12. The method recited in claim 11 wherein the step of adaptively correlating the signals comprises the steps of:
    thresholding the reduced crosstalk signal;
    subtracting the reduced crosstalk signal from the thresholded reduced crosstalk signal to produce an error signal;
    correlating the error signal with the signals of the two adjacent channels using multiplication and integration 45 to produce the respective weighting factors.

13. The method recited in claim 12 wherein the step of correlating the signals comprises the steps of:

multiplying the output signals from the second summing device by the outputs of the two adjacent channels; and integrating outputs of the respective multipliers to produce the respective weighting factors.

* * * * *